(12) United States Patent
Hiraoka et al.

(10) Patent No.: US 7,091,674 B2
(45) Date of Patent: Aug. 15, 2006

(54) RARE GAS FLUORESCENT LAMP DEVICE

(75) Inventors: Takahiro Hiraoka, Hyogo (JP); Koji Oda, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/792,770

(22) Filed: Mar. 5, 2004

(65) Prior Publication Data
US 2004/0183479 A1    Sep. 23, 2004

(30) Foreign Application Priority Data
Mar. 7, 2003 (JP) .............................. 2003-061260

(51) Int. Cl.
*H01B 37/02* (2006.01)
*F02P 3/12* (2006.01)
(52) U.S. Cl. ............................... 315/291; 315/209 PZ
(58) Field of Classification Search ................ 315/291, 315/209 PZ
See application file for complete search history.

(56) References Cited

U.S. PATENT DOCUMENTS 6,222,545 B1 * 4/2001 Suzuki et al. ............... 345/418
6,483,253 B1   11/2002 Okamoto et al.
6,661,545 B1 * 12/2003 Sato et al. .................. 358/509
6,757,084 B1 *  6/2004 Kurita et al. ............... 358/509

FOREIGN PATENT DOCUMENTS

| JP | 06-334817 A1  | 12/1994 |
| JP | 07-074890 A1  |  3/1995 |
| JP | 07-336501 A1  | 12/1995 |
| JP | 11-312596 A1  | 11/1999 |
| JP | 2001-085182 A1 | 3/2001 |
| JP | 2001-110587 A1 | 4/2001 |

* cited by examiner

Primary Examiner—Trinh Vo Dinh
(74) Attorney, Agent, or Firm—Rader, Fishman & Grauer PLLC

(57) ABSTRACT

A lighting apparatus comprising a branch circuit wherein a light receiving cycle signal branches into a synchronizing signal and a light controlling signal, a frequency recognizing circuit which wherein a lighting frequency is calculated from the light controlling signal and a light intensity controlling signal is outputted, and an inverter circuit which receives the light intensity controlling signal and turns on a lamp based on the light intensity controlling signal.

3 Claims, 13 Drawing Sheets

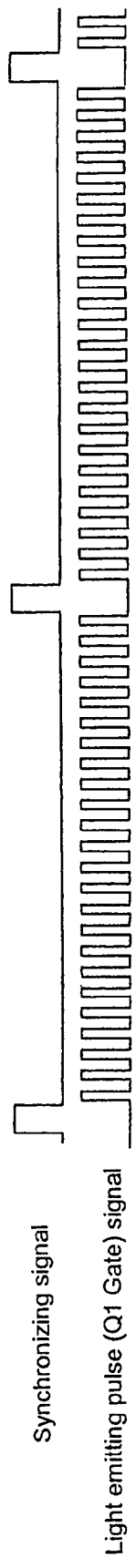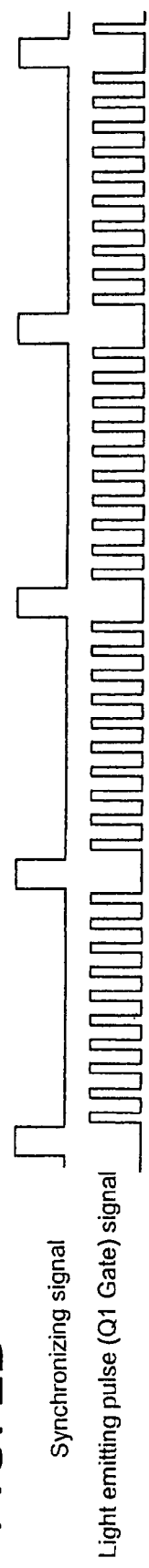
FIG. 2A
FIG. 2B

Variable frequency signal (f$_{30}$)

PWM Controlling circuit Oscillation signal (f$_{20}$)

Switching element Driving signal (f$_{Q1}$)

Lamp current (I$_L$)

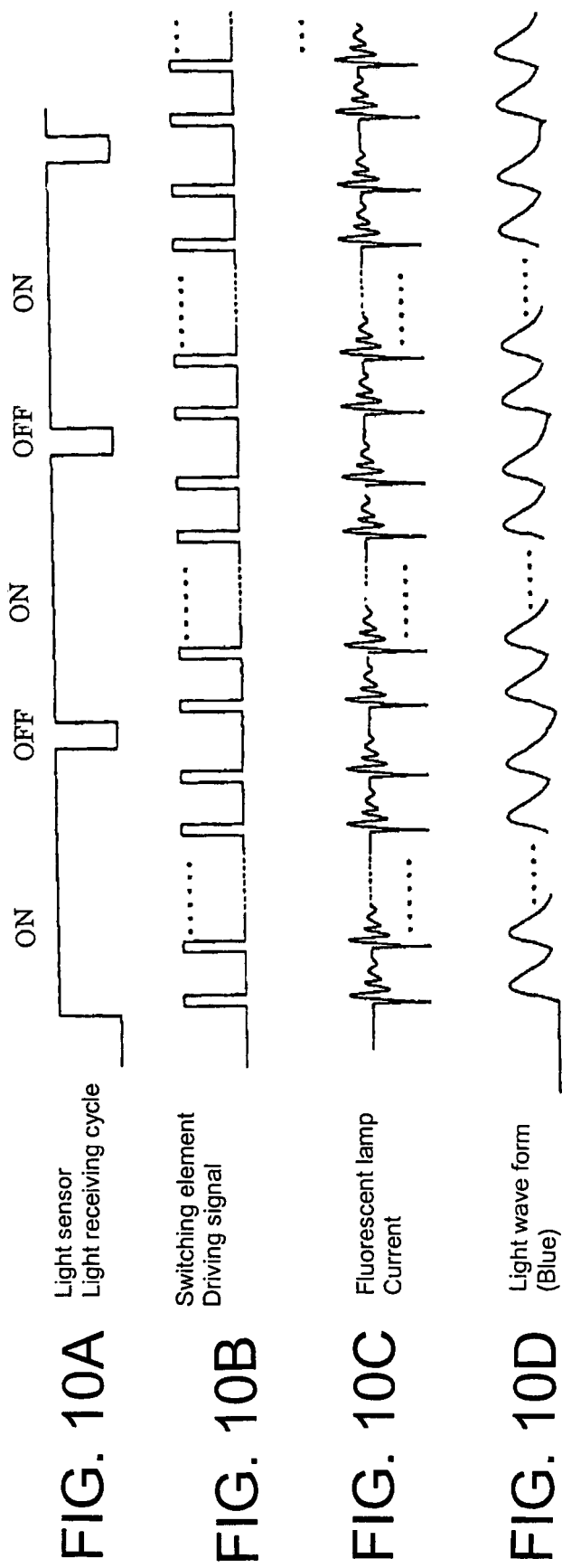

RARE GAS FLUORESCENT LAMP DEVICE

TECHNICAL FIELD OF THE INVENTION

The present invention relates to a rare gas fluorescent lamp lighting apparatus which is used in a light source device for scanning an image, which is provided in a copying machine, a facsimile machine, a scanner and the like.

DESCRIPTION OF RELATED ART

An external electrode type rare gas fluorescent lamp is known as a fluorescent lamp used as a light source for scanning an image, in, for example, a copying machine, a scanner etc. The external electrode type rare gas fluorescent lamp has a pair of strip-shaped external electrodes disposed on an outer surface of a glass tube wherein high-frequency voltage is applied to these electrodes so as to light the lamp.

FIGS. 6A and 6B show a schematic view of the external electrode type rare gas fluorescent lamp. FIG. 6A shows a cross sectional view taken in a direction perpendicular to the axis of the tube. FIG. 6B shows a side elevational view thereof.

As shown in FIGS. 6A and 6B, the external electrode type rare gas fluorescent lamp 11 comprises a discharge container 13 which is made of dielectric material such as glass etc. and is disposed along the full length of the discharge container in the tube axis direction, a pair of electrodes 12 and 12' (or line shaped electrodes) made of aluminum, and a fluorescent material layer 14 formed on the discharge container 13. Sequential high frequency voltage or pulse-like high frequency voltage is applied to these external electrode 12 and 12' so as to light the lamp 11.

FIG. 7 shows a lighting apparatus which turns on such an external electrode type rare gas fluorescent lamp. Further, FIG. 7 shows an example in which a fly back type switching power supply circuit is applied to the lighting apparatus of an external electrode type rare gas fluorescent lamp. The lighting apparatus comprises a switching element Q1 such as MOS FET etc., a PWM controlling circuit 20, a pulse transformer T1, and the external electrode type rare gas fluorescent lamp 11. In this system, energy is stored in the pulse transformer T1 when the MOS FET which is the switching element Q1, is turns on, and when the MOS FET of the switching element Q1 is turned off by the PWM controlling circuit 20, the energy stored in the pulse transformer T1 is applied to the rare gas fluorescent lamp 11 in form of a pulse-like voltage waveform.

As shown in FIG. 8A, the variable frequency oscillator 30 is connected to the PMW controlling circuit 20. The PMW controlling circuit 20 is connected to a switching element Q1 and a current detecting element 40. Furthermore, in FIG. 8A, in addition to the lighting circuit shown in FIG. 7, a light intensity controlling signal as a variable frequency signal from a variable frequency oscillator 30 is inputted to the PWM controlling circuit 20 so as to turn on the rare gas fluorescent lamp 11. At this time, the lighting circuit operates so that the variable frequency signal and the number of light emitting frequency agree thereby appropriately selecting light emitting pulses of the lamp 11 per unit time so as to change the light intensity.

FIG. 8B shows the waveform of a variable frequency signal f30 outputted from the variable frequency oscillator 30 which is shown in FIG. 8A, an oscillation signal f20 outputted from the PWM controlling circuit 20, a drive signal fQ1 outputted from the switching element Q1, and lamp current IL.

FIG. 9 shows a circuit which controls an oscillation operation of the light emitting pulse determined in the lighting apparatus shown in FIG. 7 by a light receiving cycle signal (namely, a synchronizing signal) inputted into the PWM controlling circuit 20 from an original paper scanning apparatus (not shown).

For example, when a synchronizing signal is at "HIGH" level, the oscillation operation is permitted and when it is at "LOW" level, it stops the oscillation operation.

That is, since the oscillation operation inside the lighting circuit starts from the time the synchronizing signal shifts from the "LOW" level to the "HIGH" level, it is possible to control the oscillation which is synchronized with the synchronizing signal.

FIGS. 10A, 10B, 10C, and 10D show respective timing charts of respective signals of the sections shown in FIG. 9, that is, a light receiving cycle signal, a driving signal of a switching element, fluorescent lamp current and light waveform (blue) respectively.

In addition, an inverter is operated based on an ON/OFF signal shown in FIG. 7 so as to control lighting of the lamp.

In recent years, digital image scanning apparatuses have become dominant in use. They are remarkably different from the conventional analog system in terms of use of photo acceptance units (light receiving element), such as CCD, as an image scanning sensor. In the conventional analog copying machine, a charged photosensitive drum is exposed to light corresponding to a scanned image thereby forming an latent image on the photosensitive drum, after that, toner being attached to the latent image on the photosensitive drum, and the toner being transferred to and fixed on a paper sheet thereby making a copy of the original.

Therefore, in the conventional analog copying machine, only one copy of the original can be produced in one scanning operation. When copying multiple copies, it is necessary to perform the scanning operation times corresponding to the number of sheets to be copy. On the other hand, since data obtained from scanning images can be stored in a memory by using photo acceptance units, such as CCD, and carrying out digital processing, multiple copies of the original can be produced in one scanning operation. Furthermore, since such an image can be processed as electronic data, it is possible to store it in electronic media or attach it to E-mail.

The overview about the synchronizing signal in such a digital color image scanning apparatus is described below.

In the digital image scanning apparatus, an image is irradiated with a rare gas fluorescent lamp, and the reflected light is read with the photo acceptance units (light receiving element), such as a CCD, through a reduction optical system. At this time, data of every predetermined line on an image is obtained from the CCD one by one, while scanning the image. In scanning a color image, a light source which emits white light is required.

Generally, in a fluorescent lamp, red, blue, and green florescent materials are mixed, thereby emitting white light. Each fluorescent material has its peculiar afterglow time. Of these three color fluorescent materials, especially, $BaMg2Al_2O_3$: $Eu^{21}$, $Mn^{21}$, etc. is known as a blue fluorescent material, but, in general, afterglow time thereof is short such as less than 1 ms. For this reason, the balance of blue luminescence and other two colors materially influences to color reproducibility.

For example, in case that one line scanning time, and light emitting frequency, are 200 ps, and 70 kHz respectively, about 13 to 14 pulse light emissions can take place within the scanning time. The relation of synchronizing signal and light waveform is schematically shown in FIGS. 11A and 11B.

Light from the blue fluorescent material attenuates in a light emitting pulse cycle since afterglow of the blue fluorescent material is short. Although, in fact, the light intensity does not fall to zero within one light emitting cycle, in order to simplify the explanation, it is described in the figure, that the light intensity falls to zero within one light emitting cycle. The light receiving cycle of the light receiving sensor is one line reading cycle. A light signal(s) that enters to the CCD during the time of the "HIGH" level is read as an image. FIGS. 11A and 11B show timing chart in case of 14 and 13 light emitting pulses in the one line reading cycle respectively.

The light intensity difference is calculated by using the following equation:

$$(14-13) \times S/14 \times S = 7\%$$

S: Light Intensity per one pulse

This causes image unevenness and color unevenness and is not desirable as an image reading apparatus. Experientially, it is desirable that the intensity difference is less than 3%.

Next, in case of turning on the rare gas fluorescent lamp in form of a pulse, a synchronizing signal is used for constantly obtaining approximately the same number of the lighting pulses during one line cycle so that the constant light intensity in one line reading cycle is secured when scanning an image.

There are two types of methods for synchronization, that is, a method for synchronizing a start of scanning with a timing of pulse light emission while an operation (oscillation) of an inverter is stopped temporarily, and a PLL method for controlling the number of pulse light emission in one line scanning cycle to be the same. The former is described in Japanese Laid Open Patent No. 2001-110587, and the latter is described in Japanese Laid Open Patent No. 2000-323292.

Moreover, the light intensity controlling signal is used to appropriately control the light intensity of the lamp depending on circumstances of use, that is, compensation of light intensity fluctuation of the lamp, effective use of dynamic range of the CCD or the image scanning speed and so on.

In Japanese Laid Open Patent No. 2001-085182, the light intensity control is described. In addition, Japanese Laid Open Patent No. 2001-110587 describes that light intensity is controlled by a synchronizing signal and a delay circuit.

Conventionally, the two controlling methods described above were designed for separate purposes, and as a demand of the market, both methods are not simultaneously used. Specifically, for the light intensity control, since applications to an image scanning apparatus have not been developed, such a light intensity controlling method is rarely adopted for a lighting apparatus that uses a rare gas lamp for scanning an image.

Also see Japanese Laid Open Patent No. 11-312596 for background of the present invention.

SUMMARY OF THE INVENTION

For example, recently, there is a demand in the market that light intensity be controlled according to individual purposes in scanning an image, e.g., in order to save power at the time of image scanning by controlling the light intensity according to a image scanning speed. At this time, a complicated sequence is necessary to individually control these three signals, i.e. the synchronizing signal, a light intensity controlling signal, and the ON/OFF signal, and therefore, it is necessary to simplify the circuit specification.

Furthermore, in a circuit described in Japanese Laid Open Patent No. 2001-085182, the frequency of light emitting pulses is controlled so as to control the light intensity arbitrarily.

Japanese Laid Open Patent No. 11-312596 describes a circuit carrying out a synchronous operation, i.e., a circuit which arranges an operation of a drive signal of a switching element according to the light receiving cycle of a light receiving sensor.

In Japanese Laid Open Patent No. 2000-323292, a circuit which generates a constant light emitting pulses in a synchronizing signal cycle is described.

In addition, in the above-mentioned Japanese Laid Open Patent, it is premised that the operation of light intensity control and the operation by the synchronizing signal are individually controlled.

Recently, there is a demand that an image scanning apparatus is operated with appropriate light intensity according to each image scanning mode so as to save energy. Specifically, the scanning mode is related with scanning speed or the resolution. Then, it is necessary to simultaneously perform light control by a light controlling signal and synchronization with the light receiving cycle of the light receiving sensor. When the synchronization and the light control are carried out by the method described in the above-mentioned Japanese Laid Open Patents, it is necessary to input two signals according to the respective purposes, that is, the light intensity controlling signal and the synchronizing signal, into a power source apparatus for lighting the lamp.

It is an object of the present invention to provide a rare gas fluorescent lamp lighting apparatus having functions to not only carry out the conventional synchronization, but also to appropriately select necessary light intensity, that is, to control light intensity by determining the frequency of a synchronizing signal, noting that when in several scanning modes, as new uses, change of light receiving cycle of the light receiving sensor, that is, a plurality of synchronizing signals, is used and scanning speed is appropriately selected, necessary light intensity differs depending on respective synchronizing frequencies, and further, it is necessary for light intensity to correspond to the synchronizing signal in the proportion of one to one.

It is another object of the present invention to simultaneously perform the synchronization operation and the light intensity control operation by a single synchronizing signal in a lighting apparatus without inputting the two signals, that is, the synchronizing signal and the light controlling signal.

In order to solve the above problem, the present invention provide a rare gas fluorescent lamp lighting device for an image scanning apparatus having a rare gas fluorescent lamp and an image scanning sensor which is operated in a predetermined light receiving cycle, wherein pulse like voltage is impressed to the rare gas fluorescent lamp or pulse like current is applied to the rare gas fluorescent lamp, and the rare gas fluorescent lamp is turned on by a light receiving cycle signal received from the image scanning sensor, and a light intensity controlling signal which is related to the light receiving cycle signal is calculated and outputted so as to turn on the rare gas fluorescent lamp based on the light intensity controlling signal.

A light intensity controlling signal which is related with the light receiving cycle signal means a signal for controlling light intensity depending on the frequency of a light receiving cycle signal.

Further, the present invention is to provide a lighting apparatus comprising a branch circuit wherein a light receiving cycle signal branches into a synchronizing signal and a light controlling signal, a frequency recognizing circuit which wherein a lighting frequency is calculated from the light controlling signal and a light intensity controlling signal is outputted, and an inverter circuit which receives the light intensity controlling signal and turns on a lamp based on the light intensity controlling signal.

DESCRIPTION OF THE DRAWINGS

FIG. 2A is a timing chart for the case that the frequency of a synchronizing signal is set to 5 kHz, and the frequency of a light emitting pulse is set to 120 kHz;

FIG. 2B is a timing chart for the case that the frequency of a synchronizing signal is set to 10 kHz and the frequency of light emitting pulses is set to 100 kHz;

FIGS. 10A, 10B, 10C, and 10D show respective timing charts of respective signals of the sections shown in FIG. 9;

DETAILED DESCRIPTION OF THE INVENTION

Embodiments of the present invention will be described below with reference to the accompanying drawings.

Figure 1A:
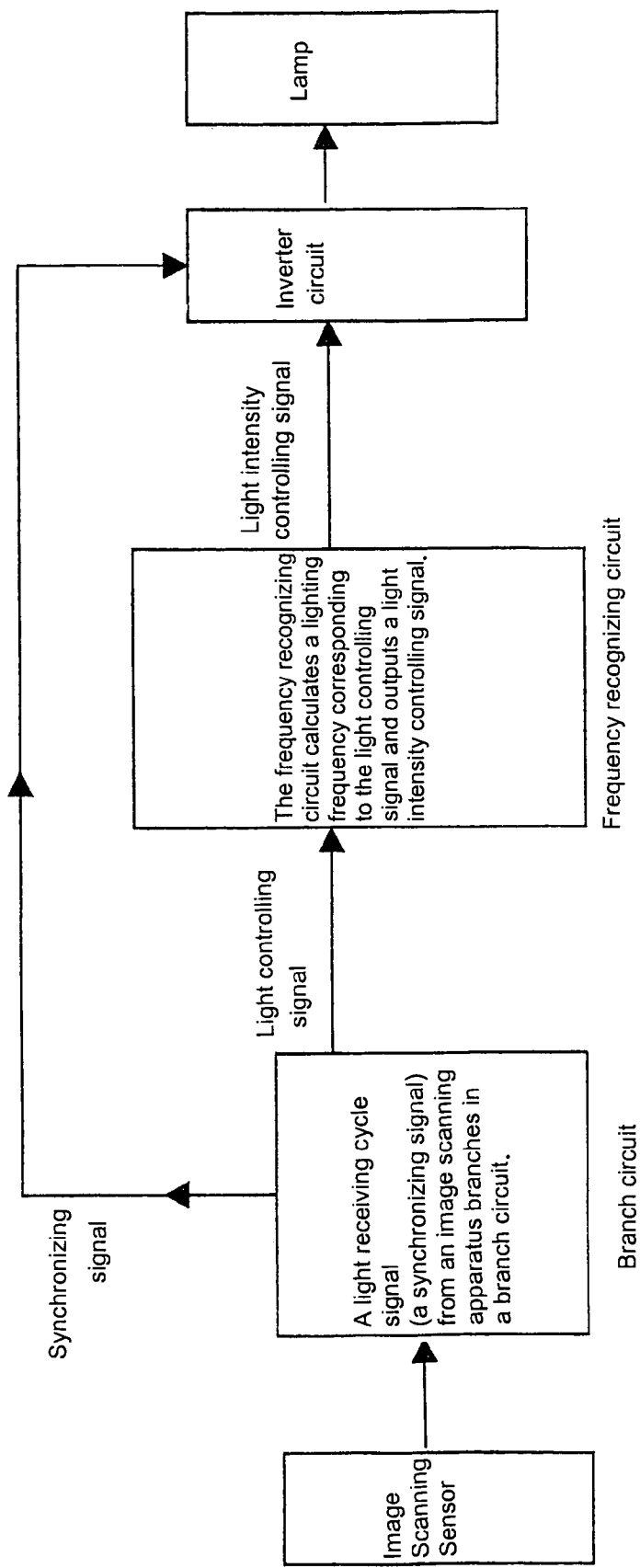
FIG. 1A shows a block diagram to illustrate an embodiment of the present invention.

FIG. 1A shows a block diagram to illustrate an embodiment of the present invention.

A light receiving cycle signal (a synchronizing signal) from an image scanning apparatus branches in a branch circuit so as to generate a synchronizing signal and a light controlling signal. Although the signal is called a light controlling signal, it is a signal equivalent to the synchronizing signal.

The light controlling signal enters to a frequency recognizing circuit. The frequency recognizing circuit calculates a lighting frequency corresponding to the light controlling signal and outputs a light intensity controlling signal. The light intensity controlling signal is inputted into the inverter circuit, and the signal is inputted to a lamp from the inverter circuit.

Figure 1B:
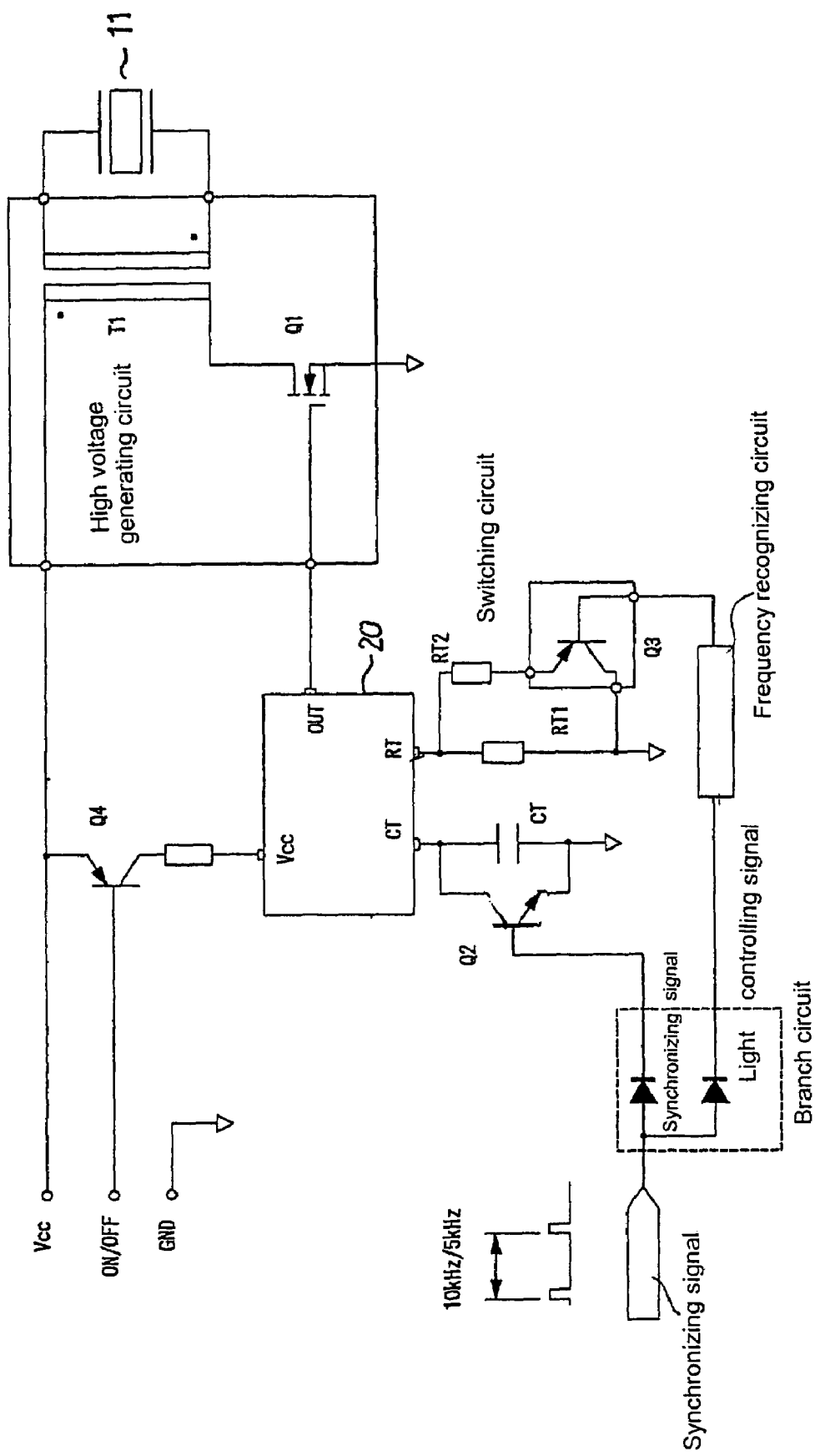
FIG. 1B is a block diagram illustrating the details of the inverter circuit.

FIG. 1B is a block diagram illustrating the details of the inverter circuit.

For explanation, this circuit is described based on the assumption that a control circuit 20 used for a switching regulator etc. is used. In a general controlling circuit, RT and CT terminals are disposed in order to determine oscillation frequency. A charge/discharge circuit is formed by a resistor and a capacitor which are connected to the outside of the controlling circuit 20 so as to carry out an oscillation operation. The RT represents a terminal for connecting the resistor, and CT represents a terminal for connecting the condenser. The controlling circuit 20, in general, is designed so that the oscillation frequency of a switching regulator is determined by the time constant at time of charging/discharging.

First, the structure of the inverter circuit is described below.

The inverter circuit comprises a PWM controlling circuit (controlling circuit) 20 which appropriately controls the switching element Q1 and a high frequency generating circuit containing the switching circuit Q1. Vcc is inputted into the frequency generating circuit and the frequency generating circuit is connected to GND. Moreover, an ON/OFF signal which is used for controlling to turn on/off the lamp, and the synchronizing signal described above are inputted into the PWM controlling circuit.

The PWM controlling circuit 20 has a RT terminal and a CT terminal to determine the time constant. The time constant is determined by resistance component that consists of RT1, RT2, and Q3 which are connected to the RT terminal, and capacitance component that consists of CT and Q2 connected to the CT terminal. On the other hand, the synchronizing signal branches so as to go through the component elements (CT and Q2) of the capacitance component for synchronization and the components elements (RT1, RT2, Q3) of the resistance component for changing the frequency. The branch circuit is constituted by, for example, a diode etc. so as to avoid mutual interference.

Next, an operation of the inverter circuit is described below.

First, 24 V DC is inputted into the inverter circuit as the Vcc. Next, the light receiving cycle signal, that is, the synchronizing signal is inputted into the lighting apparatus from the original paper scanning apparatus (not shown). Furthermore, by inputting the ON/OFF signal, the PWM controlling circuit 20 carries out an oscillation operation, and the switching element Q1 such as an FET repeatedly operates so as to be turned ON/OFF, and pulse-like voltage is impressed to the lamp 11 through a pulse transformer T1 so that the lamp 11 is turned on.

The synchronizing signal represents a cycle that agrees with a scanning cycle by CCD (Charge coupled device) which is an image scanning element, i.e., a cycle in which an original document surface is scanned. The scanning cycle comprises one unit of time during which an original paper is scanned, and relates to the scanning resolution of the original paper sheet. That is, as the light intensity is high and the scanning cycle is long, the S/N ratio of one unit becomes large and the resolution becomes high.

An embodiment in which the synchronizing signal is applied in form of rectangular pulse signals, is described below.

However, the present invention is not limited to such signal form. This synchronizing signal branches, in the branch circuit, into the synchronizing signal used for the synchronization operation and the light controlling signal which is equivalent to the synchronizing signal used for control of light intensity.

The signal which is called the "light controlling signal" is an incoming signal of the frequency recognizing circuit, and an calculation operation is carried out to the light controlling signal in the frequency recognizing circuit in order to generate the light intensity controlling signal.

FIG. 1B shows an example in which interference is prevented by a diode. The synchronizing signal is inputted into the CT terminal of the control circuit 20 as an oscillation stopping signal.

In FIG. 1B, when the synchronizing signal is at "HIGH" level, the switching element Q2 is turned on thereby discharging the electric charge in the capacitor CT, and both ends thereof are set to 0V (zero voltage) thereby resetting the oscillation. Thus, the oscillation is stopped during the period when the switching element Q2 is turned ON. Thus, the lamp 11 is tuned off during the period when the voltage level of the synchronizing signal is "HIGHT". On the other hand, the synchronizing signal is divided into the synchronizing signal and the light controlling signal in the branch circuit, the light controlling signal being inputted into the frequency recognizing circuit, the frequency recognizing circuit outputting the light intensity controlling signal, so as to control to turn on and off the switching element Q3.

That is, when the switching element Q3 is turned on by the frequency of the synchronizing signal, the resistor connected to the terminal RT turns into parallel resistors RT1 and RT2 so that the oscillation frequency becomes high. That is, the illumination intensity becomes high. Moreover, when the switching element Q3 is turned off, the value of RT turns solely into a value of RT1, and the frequency becomes low, and the illumination intensity becomes low. By selecting the value of the resistance (RT) suitably, the range of light intensity control can be chosen arbitrarily.

For example, where there are two scanning frequencies, 5 kHz and 10 kHz, a synchronizing signal which agrees with each frequency is inputted.

FIGS. 2A and 2B show timing charts of the synchronizing signal and the light emitting pulse signal.

FIG. 2A is a timing chart for the case that the frequency of the synchronizing signal is set to 5 kHz, and the frequency of a light emitting pulse is set to 120 kHz. At this time, the lamp 11 is prepared so that illumination intensity thereof is 30,000 lx (lux). In addition, the illumination intensity was measured at a 8 mm distance from the surface of a rare gas fluorescence lamp tube.

The inputted synchronizing signal goes through the branch circuit to the frequency recognizing circuit. The frequency recognizing circuit outputs a "HIGH" level signal thereby turning on the switching element Q3. The time constant is determined by combined resistance of RT1 and RT2 connected to the RT terminal of the PWM controlling circuit 20, and therefore, the oscillation frequency becomes high.

FIG. 2B is a timing chart for the case that the frequency of the synchronizing signal is set to 10 kHz and the frequency of light emitting pulse is set to 100 kHz. Since the illumination intensity of the lamp 11 is approximately proportional to the frequency, in general, the illumination intensity is 25,000 lx (lux). The frequency recognizing circuit outputs a "HIGH" level signal by the inputted synchronizing signal, thereby turning on the switching element Q3 by the inputted synchronizing signal. For this reason, the time constant is determined only by RT1 connected to the RT terminal of the PWM controlling circuit 20, and therefore, the oscillation frequency becomes low.

In addition, it is also possible to operate the switching element Q3 actively if the frequency recognizing circuit is selected appropriately, and it is also possible to select the oscillation frequency sequentially according to the frequency of the synchronizing signal.

On the other hand, the synchronizing signal goes through the branch circuit, and is connected to the base of the switching element Q2 which is connected to the CT terminal of the PWM controlling circuit 20. That is, during the time when the synchronizing signal is at "HIGI" level, the switching element Q2 is turned on, and draws out the electric charge from CT, and the oscillation of the PWM controlling circuit 20 stops. When the level of synchronizing signal becomes "LOW", the switching element Q2 turns off so that the oscillation starts again. By this operation, the oscillation starting time point in one synchronizing signal cycle agrees, and lighting of the lamp 11 is synchronized with the synchronizing signal.

Figure 3:
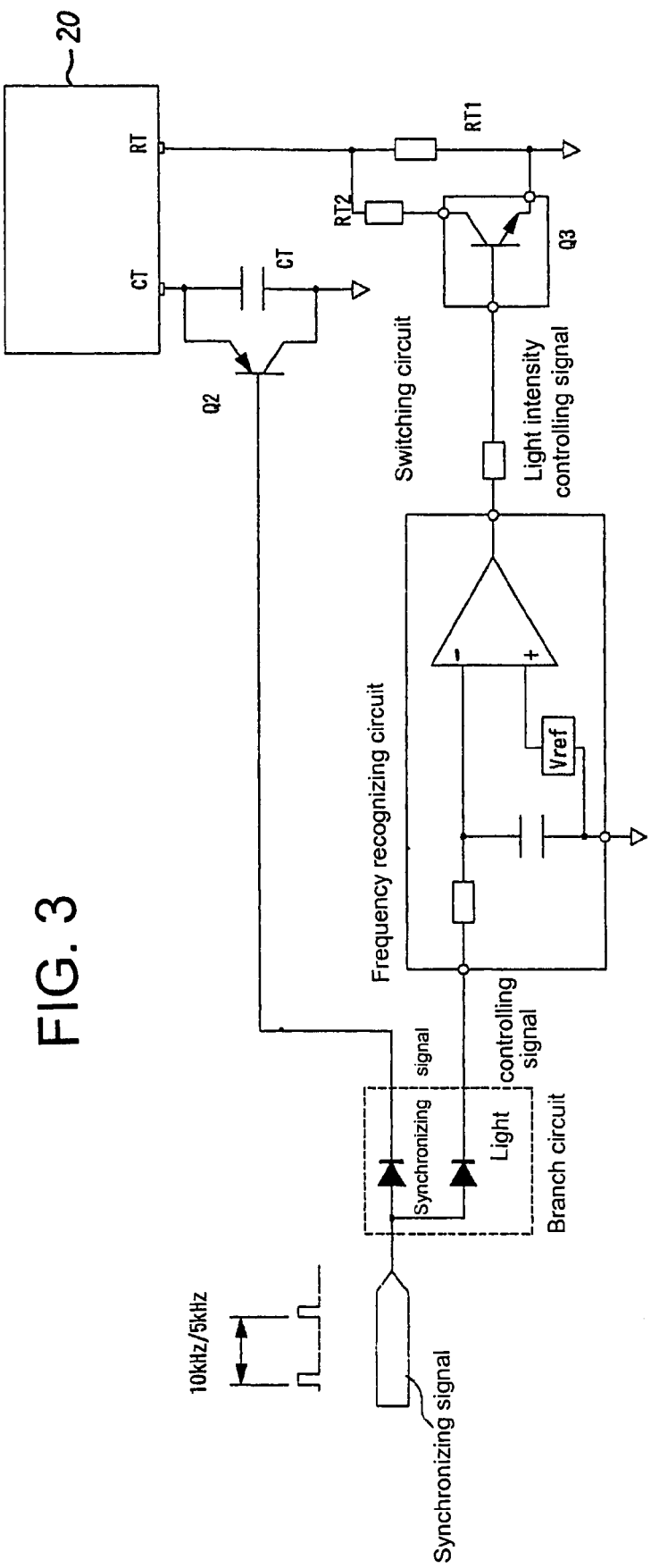
FIG. 3 shows, in detail, a second embodiment of a frequency recognizing circuit shown in the first embodiment.

FIG. 3 shows, in detail, an embodiment of the frequency recognizing circuit shown in the first embodiment.

In the embodiment, the light controlling signal is inputted into a comparator through an integrator, and the logic switching signal is reversed. The light controlling signal which is a frequency signal is integrated, converted into predetermined voltage, and determined in two values by the comparator, and the value of RT is changed in the switching circuit. As the frequency recognizing circuit, a frequency-voltage converter may be used.

Figure 4:
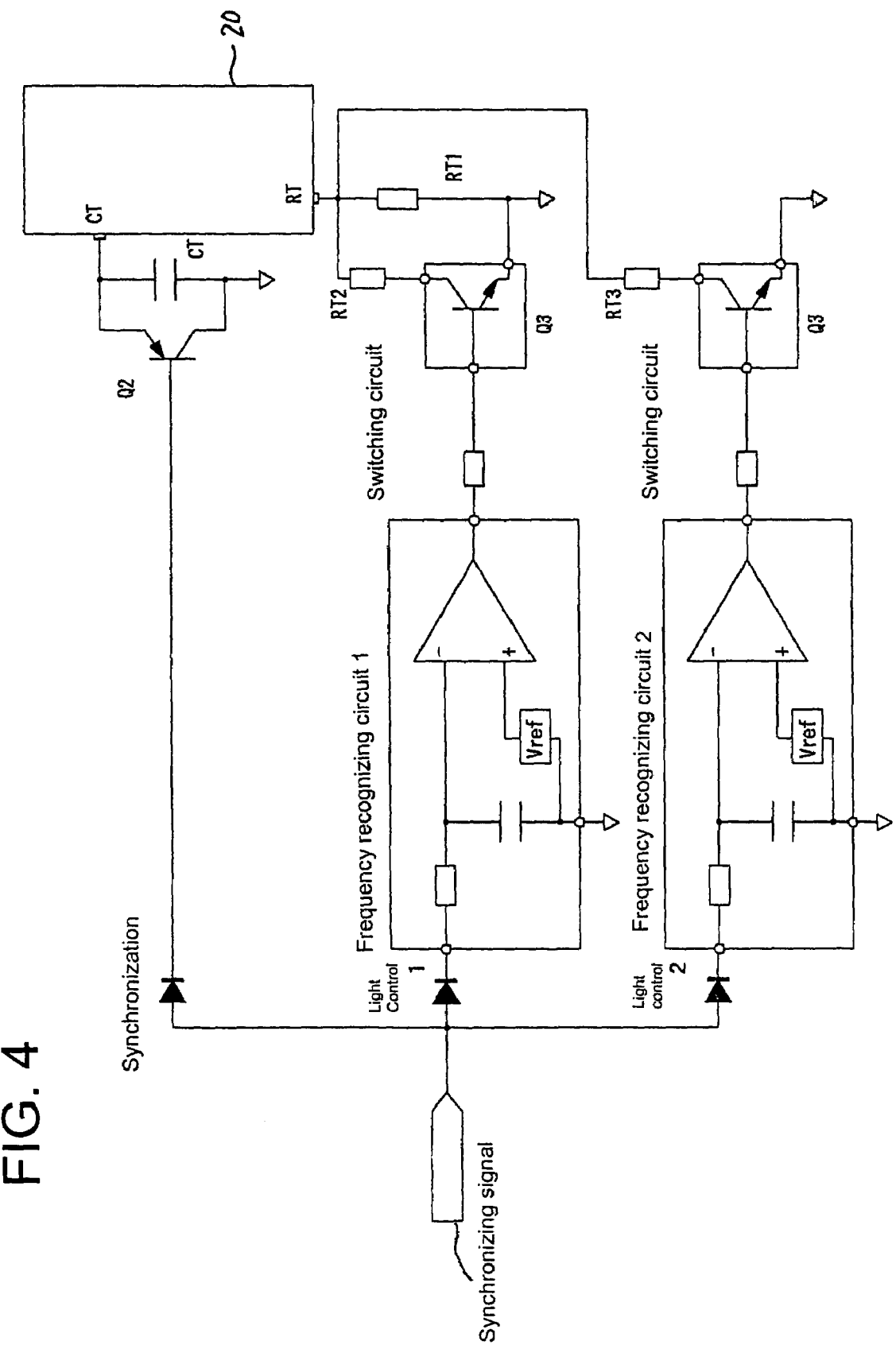
FIG. 4 shows a block diagram according to a third embodiment of the present invention.

Three kinds of frequencies of the synchronizing signal are determined similarly. Thereby, as shown in FIG. 4, it is possible to perform three steps of light intensity control.

In this circuit, RT2 and RT3 are arranged in parallel to RT1, and predetermined RT (resistor) value is acquired by turning on/off of switching elements Q2, Q3, and Q3'.

Figure 5:
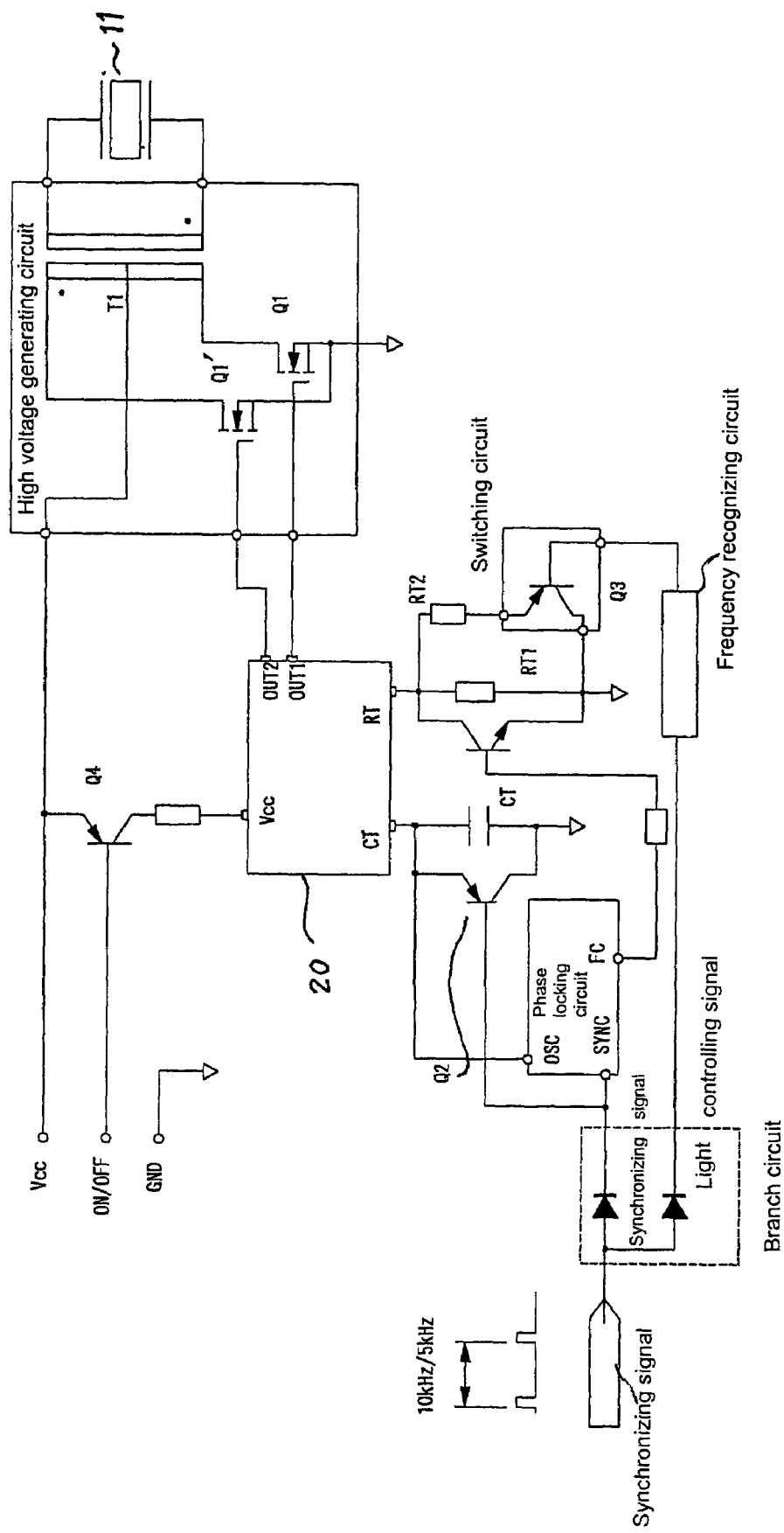
FIG. 5 shows an embodiment in which a pull-push type switching power supply circuit is applied to a lighting apparatus of an external electrode type rare gas fluorescent lamp.
Figure 6A:
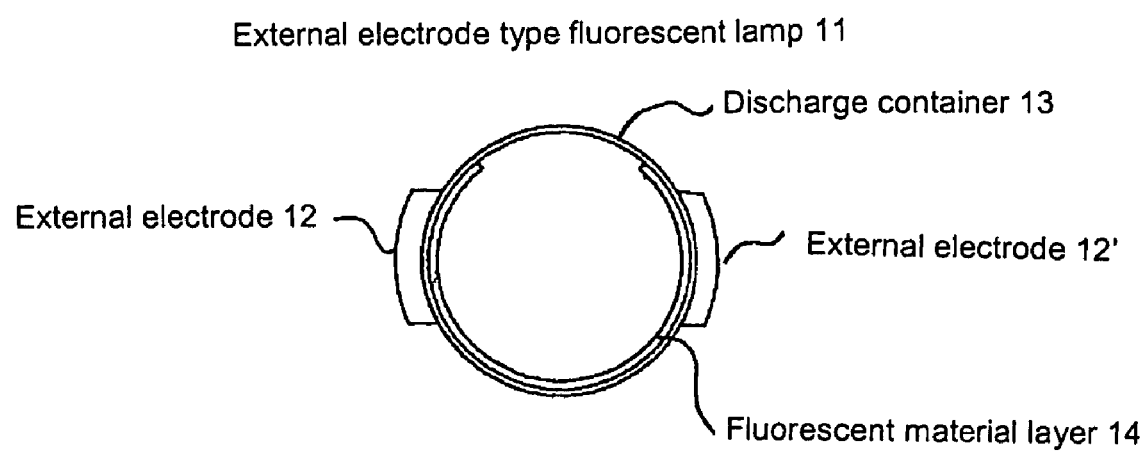
FIG. 6A shows a cross sectional view taken in a direction perpendicular to the axis of the tube.
Figure 6B:
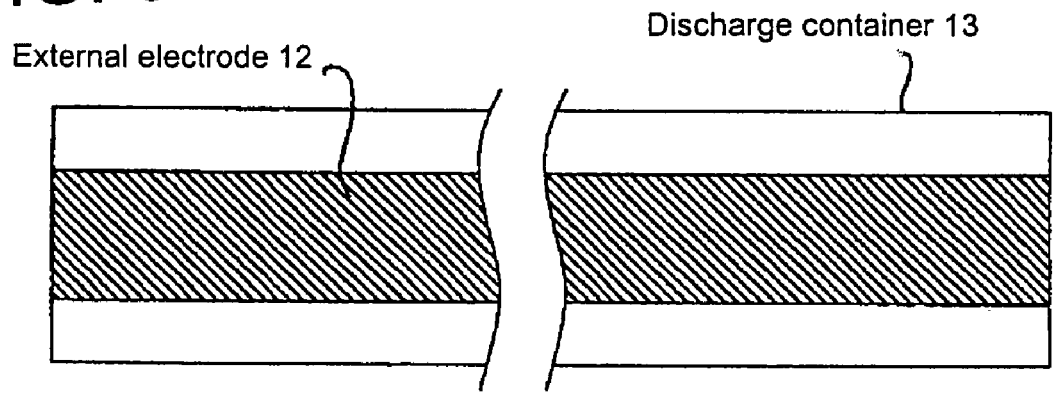
FIG. 6B shows a side elevational view thereof.
Figure 7:
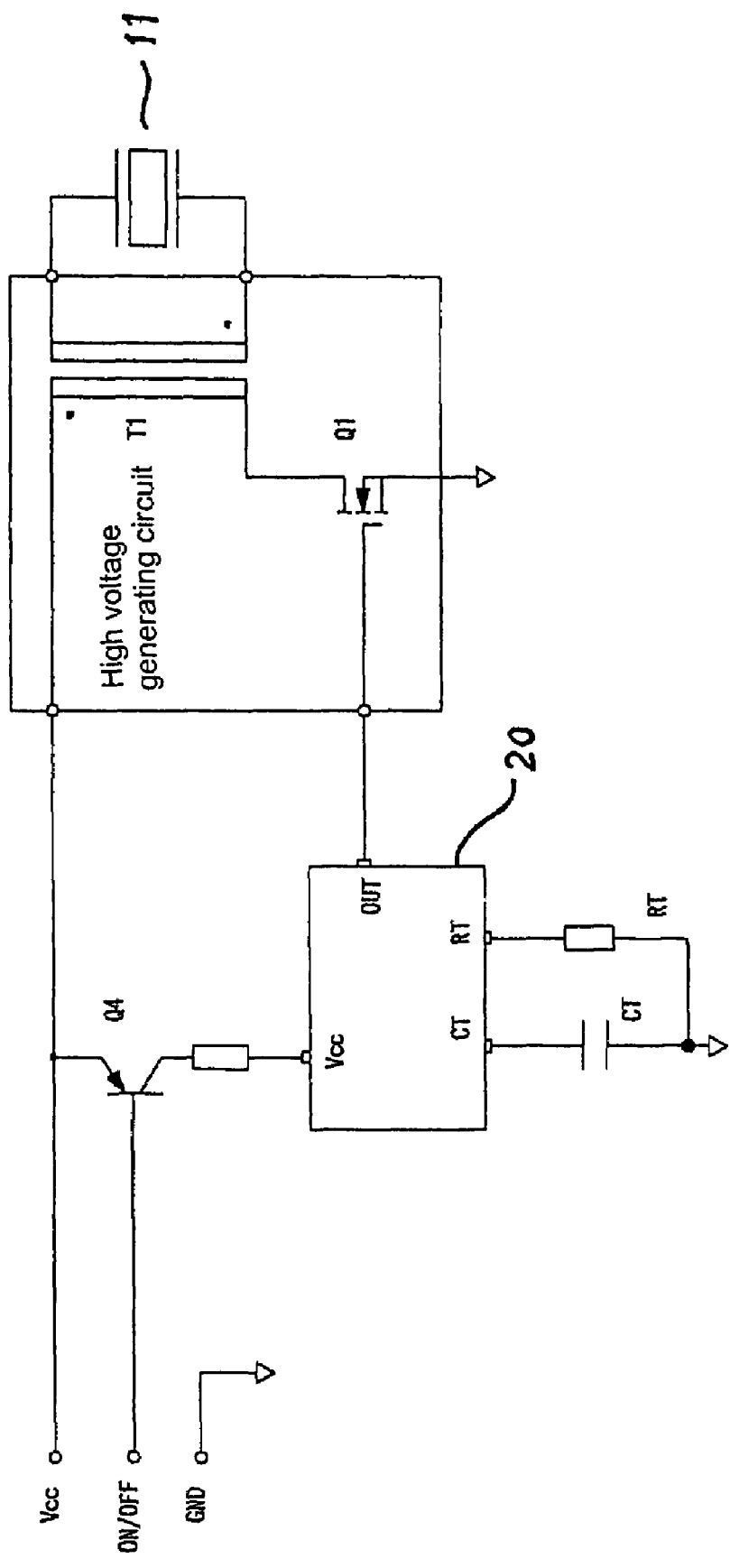
FIG. 7 shows an example in which a fly back type switching power supply circuit is applied to a lighting apparatus of an external electrode type rare gas fluorescent lamp.
Figure 8A:
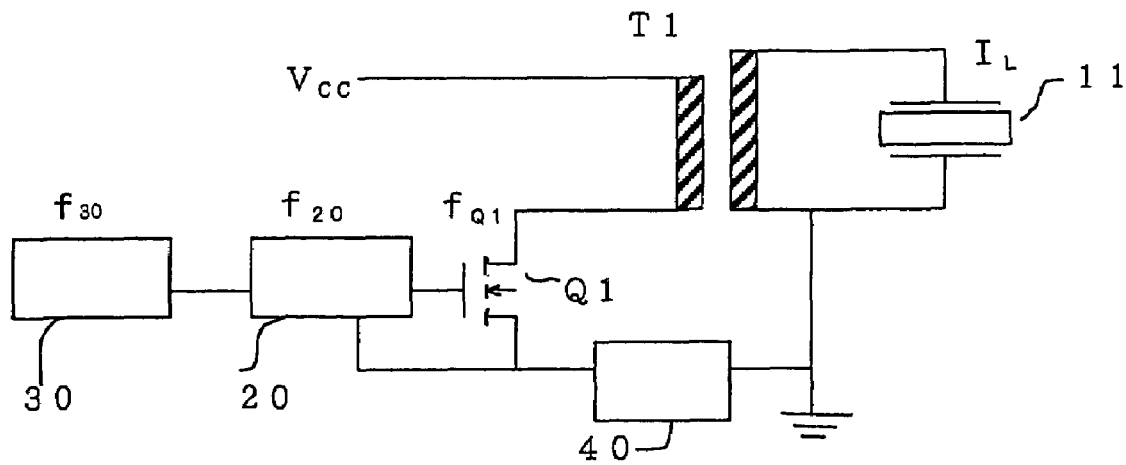
FIG. 8A shows a block diagram of a light controlling circuit of a fly back type lighting apparatus.
Figure 8B:
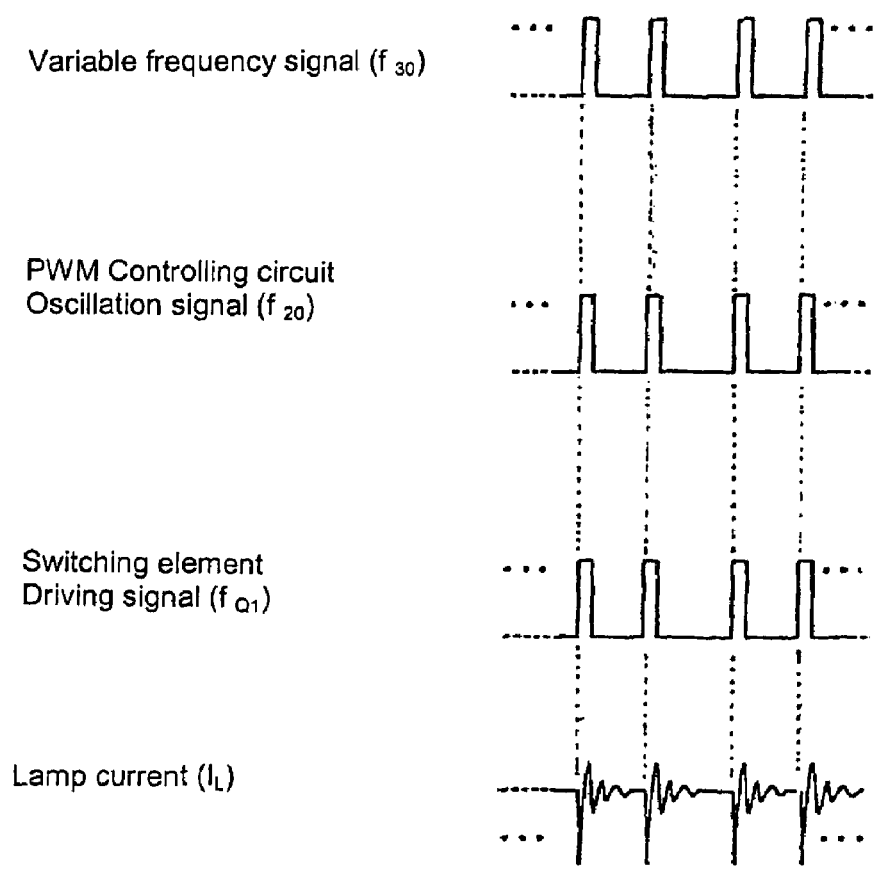
FIG. 8B shows the waveform of a variable frequency signal outputted from the variable frequency oscillator, an oscillation signal outputted from the PWM controlling circuit, a drive signal outputted from the switch element, and lamp current, which are shown in FIG. 8A.
Figure 9:
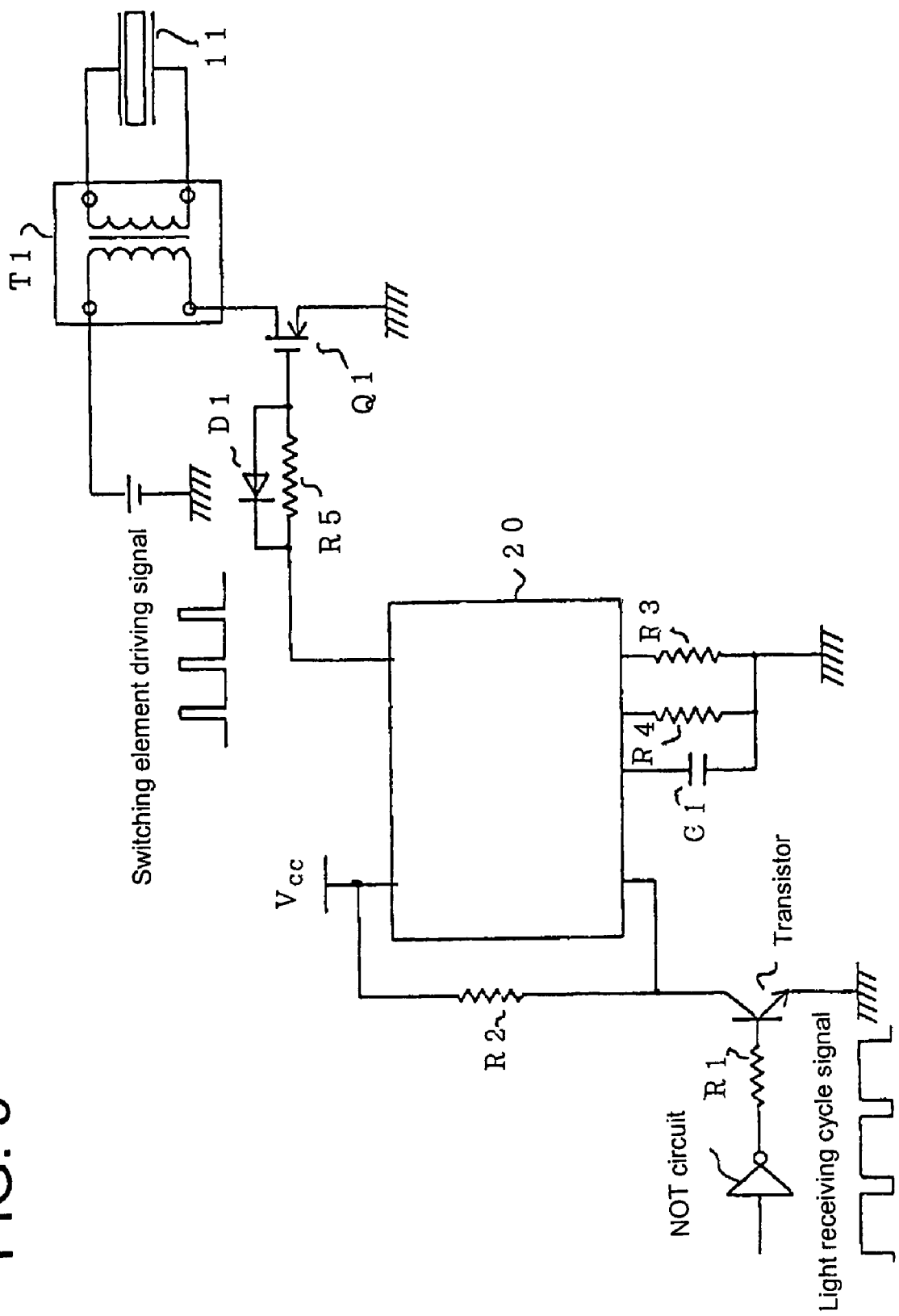
FIG. 9 shows a synchronizing circuit of a fly back type lighting apparatus.
Figure 11A:
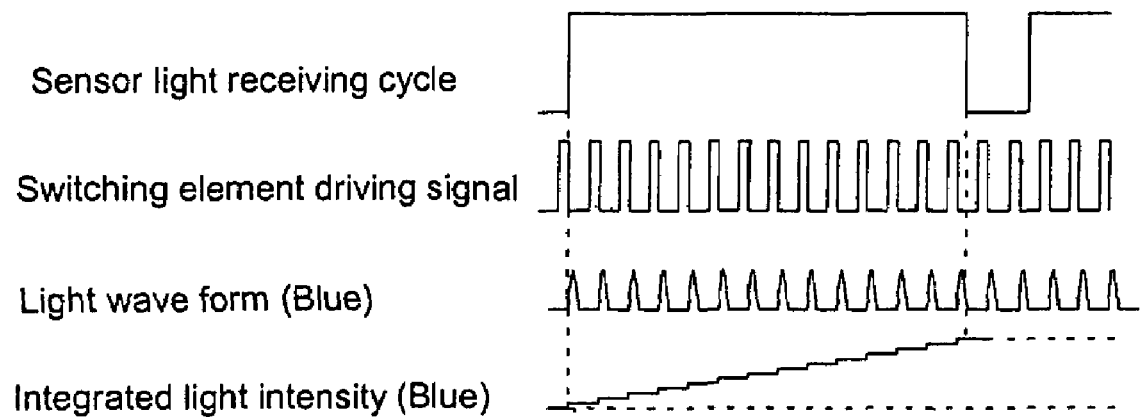
FIGS. 11A and 11B show timing charts for the case of 14 and 13 light emitting pulses in the one line reading cycle respectively.
Figure 11B:
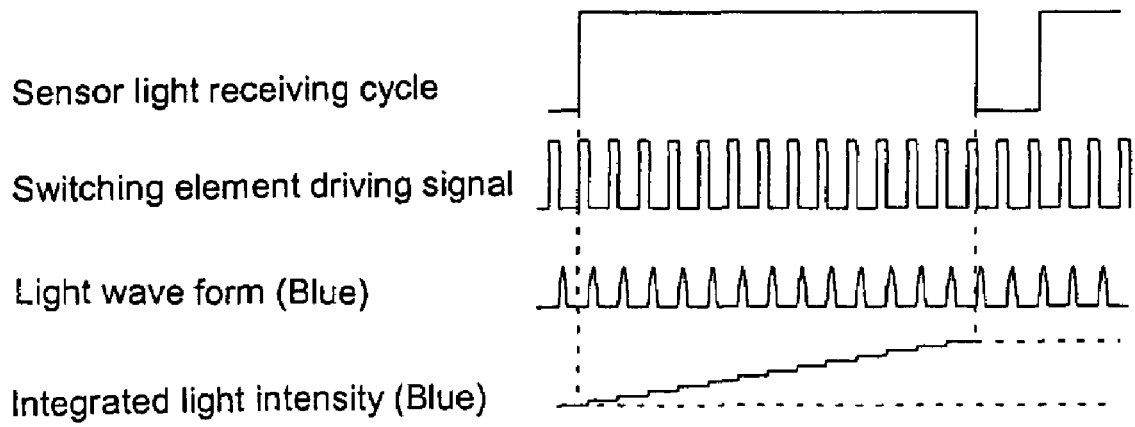

FIG. 5 shows an embodiment in which a pull-push type switching power supply circuit is applied to a lighting apparatus of an external electrode type rare gas fluorescent lamp.

The push pull type lighting apparatus comprises switch elements Q1 and Q2, such as two MOS FET, a PWM controlling circuit 20, a pulse transformer T1, and an external electrode type rare gas fluorescent lamp 11.

Alternating voltage waveform is impressed to the external electrode type rare gas fluorescent lamp 11 by alternatively turning on/off the switching elements Q1 and Q2 such as MOS FET by a controlling circuit (a gate signal generating circuit) so that pulse-like current flow through the rare gas fluorescent lamp 11 in the rise time and fall time.

In FIG. 5, the means for forming a light intensity controlling signal from the synchronizing signal is the same as that shown in FIG. 1. On the other hand, for the synchronizing operation, a circuit (described in the Japanese Laid Open Patent No. 2000-323292) for holding uniformly the number of light emitting pulses in one synchronization cycle, that is, during a light receiving sensor light receiving cycle is used.

Figure 12:
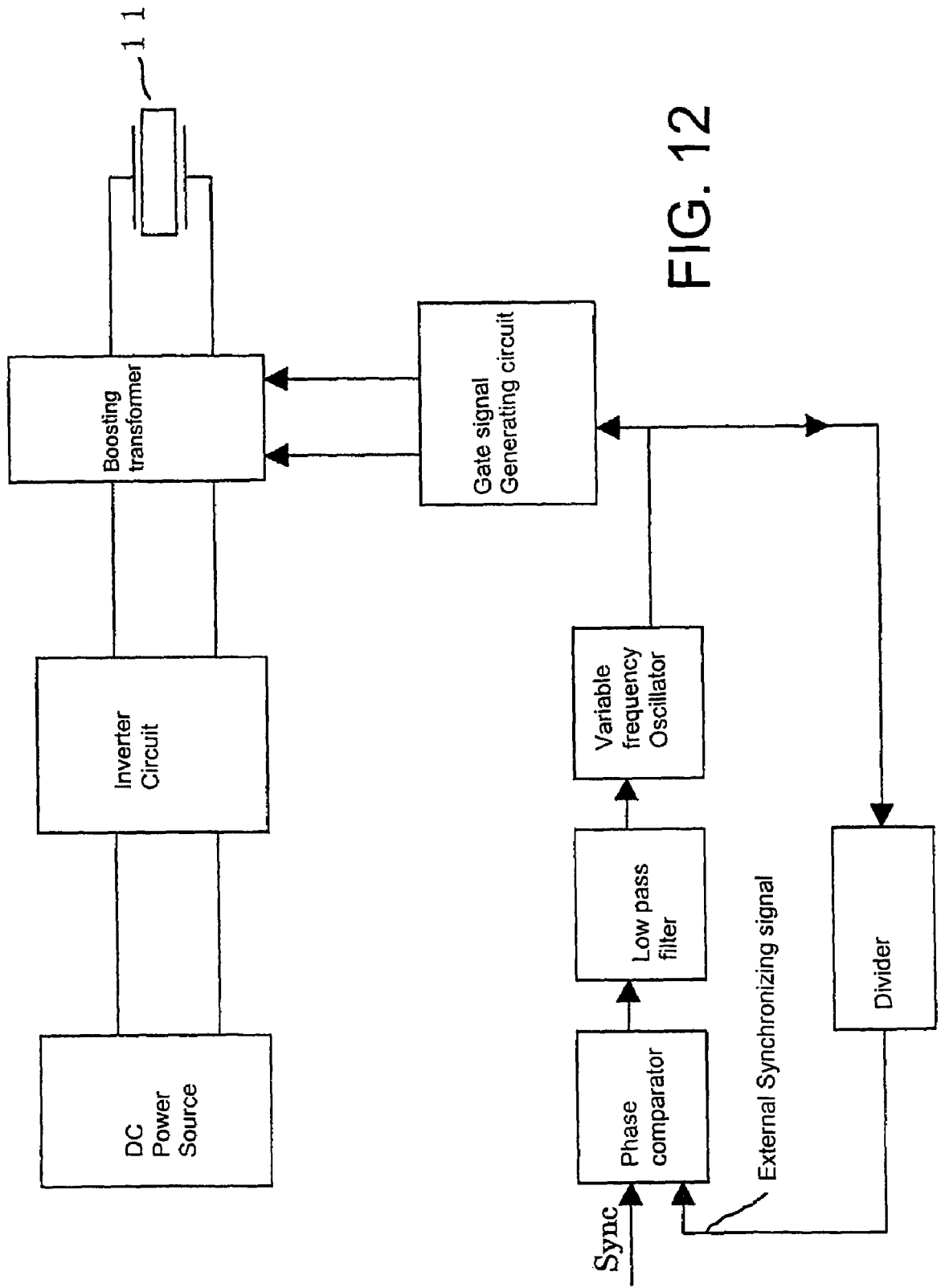
FIG. 12 shows the structure of a push pull type synchronizing circuit.

FIG. 12 shows the structure of the circuit for holding uniformly the number of light emitting pulse.

A phase comparator compares the phase of the external synchronizing signal Sync and that of the oscillation signal of the variable frequency oscillator, which is divided by a divider, and the phase lock of the oscillation phase of the variable frequency oscillator is carried out by the external synchronizing signal Sync according to the phase difference. The oscillation signal of the variable frequency oscillator is inputted into a gate signal generating circuit, and the switch element of the inverter is turned on and off by the output of a gate signal generating circuit, thereby converting DC voltage outputted by a DC power source into volts alternating current. The volts alternating current which the inverter circuit outputs is impressed to the external electrode type rare gas fluorescence lamp 11 through a boosting transformer so that the lamp 11 is turned on.

In addition, although it is most efficient to change frequency as a method for controlling light intensity, when a circuit has a boosting circuit and a voltage stepping down circuit on the upstream side of the rare gas fluorescence lamp lighting apparatus, and the stabilized voltage is inputted into a lighting apparatus, it is also possible to change light intensity by changing the voltage by the synchronizing signal.

Furthermore, in the embodiment, although the comparator as an arithmetic circuitry is exemplified, it is also possible to use a microcomputer etc., to carry out voltage conversion of the synchronizing frequency, and to change the oscillation frequency of the inverter according thereto.

As mentioned above, according to the present invention, while light intensity is controlled in order to solve the problems in scanning an image, such as that in controlling light intensity according to image scanning speed of an original paper scanning apparatus using a rare gas fluorescent lamp, or that in saving power in scanning an image, it is possible to carry out a light intensity controlling operation and a synchronizing operation with a single synchronizing signal, without independently inputting the synchronizing signal and the light intensity controlling signal. Since the synchronizing operation and the light intensity controlling operation are carried out with a single synchronizing signal, it is possible to significantly simplify the sequence of an image scanning apparatus.

Thus the present invention possesses a number of advantages or purposes, and there is no requirement that every claim directed to that invention be limited to encompass all of them.

The disclosure of Japanese Patent Application No. 2003-061260 filed on Mar. 7, 2003 including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Further, the present invention possesses a number of advantages or purposes, and there is no requirement that every claim directed to that invention be limited to encompass all of them.

What is claimed is:

1. A rare gas fluorescent lamp lighting device for an image scanning apparatus, having a rare gas fluorescent lamp and an image scanning sensor which is operated in a predetermined light receiving cycle, wherein pulse like voltage is impressed to the rare gas fluorescent lamp or pulse like current is applied to the rare gas fluorescent lamp, the rare gas fluorescent lamp lighting device comprising:

a branch circuit that receives a light receiving cycle signal and branches so as to output a light controlling signal and a synchronizing signal; and a frequency recognizing circuit that recognizes a frequency of the light controlling signal outputted by the branch circuit and calculates and outputs a light intensity controlling signal for controlling light intensity of the lamp based on the frequency of the light controlling signal so as to light the rare gas fluorescent lamp based on the light intensity controlling signal.

2. The rare gas fluorescent lamp lighting device according to claim 1, further including an inverter circuit that receives the light intensity controlling signal and lights the lamp based on the light intensity controlling signal.

3. The rare gas fluorescent lamp lighting device according to claim 1, wherein the frequency recognizing circuit comprises an integrator and a comparator, in which the frequency is calculated by the integrator and the frequency is compared by the comparator.

* * * * *